US008386478B2

(12) United States Patent
Wang (10) Patent No.: US 8,386,478 B2
(45) Date of Patent: Feb. 26, 2013

(54) METHODS AND SYSTEMS FOR UNOBTRUSIVE SEARCH RELEVANCE FEEDBACK

(75) Inventor: Yanxin Emily Wang, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 302 days.

(21) Appl. No.: 11/683,273

(22) Filed: Mar. 7, 2007

(65) Prior Publication Data

US 2008/0222131 A1  Sep. 11, 2008

(51) Int. Cl.
*G06F 17/30* (2006.01)

(52) U.S. Cl. ........................................ 707/723

(58) Field of Classification Search .............. 707/100, 707/5, 723; 715/769, 770
See application file for complete search history.

(56) References Cited

U.S. PATENT DOCUMENTS

| 5,241,671 | A | 8/1993 | Reed et al. |
| 6,078,916 | A * | 6/2000 | Culliss ........................... 1/1 |
| 6,789,076 | B1 | 9/2004 | Dutta |
| 6,829,599 | B2 | 12/2004 | Chidlovskii |
| 6,873,982 | B1 | 3/2005 | Bates et al. |
| 7,124,093 | B1 | 10/2006 | Graham et al. |
| 7,158,966 | B2 | 1/2007 | Brill et al. |
| 2003/0078914 | A1 | 4/2003 | Witbrock |
| 2005/0125382 | A1 | 6/2005 | Karnawat et al. |
| 2005/0177561 | A1 | 8/2005 | Ramanathan et al. |
| 2005/0193333 | A1 * | 9/2005 | Ebert ............................ 715/517 |
| 2005/0228890 | A1 * | 10/2005 | Lawrence ..................... 709/227 |
| 2006/0026147 | A1 | 2/2006 | Cone et al. |
| 2006/0155751 | A1 | 7/2006 | Geshwind et al. |
| 2006/0235860 | A1 | 10/2006 | Brewer et al. |
| 2006/0241908 | A1 | 10/2006 | Zheng et al. |
| 2006/0265368 | A1 | 11/2006 | Nickerson et al. |
| 2007/0162431 | A1 * | 7/2007 | Yamada et al. .................. 707/3 |
| 2007/0266022 | A1 * | 11/2007 | Frumkin et al. ................. 707/5 |

FOREIGN PATENT DOCUMENTS

EP    1284461 A    2/2003

OTHER PUBLICATIONS

European Search Report for App. No. 08152474.6-1225; Jun. 11, 2008; 7 pages.

* cited by examiner

*Primary Examiner* — Amresh Singh
(74) *Attorney, Agent, or Firm* — Armstrong Teasdale, LLP (57) ABSTRACT

Methods and systems for receiving feedback from a user regarding the relevance of search results to a search query are provided. The method includes presenting at least one search result responsive to a search query by the user, selecting ones of the at least one search result that are determined by the user to be relevant to the search query, and increasing a relevance ranking of the selected search results in future searches based on the determination.

20 Claims, 10 Drawing Sheets

Tech Data Search Engine

Tech Data Search Engine - Support and Service Group, Phantom Works

| Projects | PROJ 101 |
|---|---|
| Searches | LANDING GEAR 777 |
| | note 5 |

Search Parameters: LANDING GEAR 777

Refine Search: [Go]

View Results by: Data Sources

- PROJ 101
  - AMM
    - D633W101-AF
  - IPC
    - D633W111-AF
  - FTD
    - 777-FTD-32-0
    - 777-FTD-32-0
  - MT
    - 747-MT-32-04
  - SB
    - 717-29-0008-0

BOECOM(9)
FISR(1)
FTD(49)
ISAR(38)
MT(27)
PSDS(41)
REDARS(88)
SB(205)
SL(63)

All results (521) >> Selected results (521)

| | Source | doc # | Title | Rev | Date |
|---|---|---|---|---|---|
| 1 | MT | 777-MT-32 | MAIN LANDING GEAR EXTENSION FUNCTION | | 6/11/1999 |
| 2 | MT | 777-MT-24 | EICAS MESSAGES DUE TO ELMS PANEL ARIN | R3 | 12/14/2004 |
| 3 | MT | 777-MT-27 | AUTO SPEEDBRAKE EICAS MESSAGES DUE | R2 | 10/24/2002 |
| 4 | MT | 777-MT-29 | CROSS-CONNECTION OF HYDRAULIC LINES | | 6/15/1998 |
| 5 | MT | 777-MT-31 | "GEAR DISAGREE" EICAS CAUTION MESSAG | | 2/03/1999 |
| 6 | MT | 777-MT-32 | "PFCS INTERFACE" OR "AUTO SPEEDBRAKE" | | 8/22/1995 |
| 7 | MT | 777-MT-32 | | | |
| 8 | MT | 777-MT-32 | | | |
| 9 | MT | 777-MT-32 | | | |
| 10 | MT | 777-MT-32 | | | |
| 11 | MT | 777-MT-32 | | | |
| 12 | MT | 777-MT-12 | | | |
| 13 | MT | 777-MT-32 | | | |

1....1 777 MT 32-004 19 September 1995 MAINTENANCE SAFETY-<<<LANDIN
2....32-004 19 September 1995 MAINTENANCE SAFETY-<<<LAND
3....Airplanes During ground servicing in either the Nose or Main<<<Ge
4....unsafe condition. In the condition, the door for the related<<<LAND
5....In this condition, the door for the related<<<Landing>>><<<Gear>>
6....serious injury to persons or damage to equipment. Even with the<<
7....to persons or damage to equipment. Even with the <<<Landing>>>
8....Breaker Panel. These Circuit Breakers control power to the Nose<
9....Circuit Breakers control power to the Nose<<<Gear>>and Main<<
10....<<<Gear>>Selector Valves. Pulling these breakers prevents<<<
11....Selector Valves. Pulling these breakers prevents<<<Landing>>>
12....existence of improperly machined latch mechanisms in the Nose<
13....machined latch mechanisms in the Nose<<<Gear>>>and Main<< figure 7B

METHODS AND SYSTEMS FOR UNOBTRUSIVE SEARCH RELEVANCE FEEDBACK

BACKGROUND

Embodiments of the disclosure relate generally to methods and systems to facilitate information searching and more particularly, to methods and systems for determining a relevance feedback for search results unobtrusively.

At least some known search methodologies and search engines incorporate interactive relevance feedback as a method to improve the relevance of search results. However, interactive relevance feedback is difficult to obtain from users that are more interested in the search at hand than supplying interactive relevance feedback. Users are also reluctant to provide interactive relevance feedback due to the extra demand of time to provide the feedback and the distraction away from the search activity. In some cases, users indicate that providing interactive relevance feedback may affect the search result in an unpredictable way.

Other known systems incorporate the relevance feedback system into the display of the search results. Incremental feedback is a method used in search systems to seamlessly integrate feedback tasks. The users are shown only one document at a time. Users are requested to assess the relevance of the document before being presented another document. Some systems cluster the search results and effectively derive user's search intent without interrupting user search task. These search systems cluster the documents in several topics, and adjust the search terms according to the user's selection of clusters. In this method, the user does not need to explicitly identify their intentions, and their browsing behavior of traversing the document clusters indicates their interest. However, such incremental feedback is inefficient in browsing the results—only one document is presented each time. Also, incremental feedback may perform well when retrieving documents that have very similar contents but does not perform well in retrieving documents that cover several topics. The clustering method only helps to identify the topics the user is interested in, but provides no feedback information for a particular document.

What are needed are methods and systems for search support that can make searches more efficient for responding to requests for information by using knowledge gained unobtrusively by user feedback concerning the relevance of each document in the search results.

SUMMARY

In one embodiment, a method of receiving feedback from a user regarding the relevance of search results to a search query includes presenting at least one search result responsive to a search query by the user, selecting ones of the at least one search result that are determined by the user to be relevant to the search query, and increasing a relevance ranking of the selected search results in future searches based on the determination.

In another embodiment, a system for improving the relevancy of electronic search results over a plurality of searches includes an adaptive search engine communicatively coupled to a plurality of data items from one or more data sources stored in at least one database, the data sources searchable using a search query entered by a user wherein the search query includes at least one keyword. The system also includes a user interface configured to display to the user a ranked search result listing of data items in a first display area, the user interface including a data item repository area wherein when a data item listed in the first display area is selected and copied to the data repository a relevance of the data item with respect to the at least one keyword is increased.

In yet another embodiment, a method of performing searches of a plurality of data sources that each includes at least one data item wherein the searches are performed using relevance feedback from previous searches. The method includes presenting a first search result of the data sources based on a search query, wherein the search result includes at least one data item in ranked order based on a relevance of the search item to the search query, unobtrusively monitoring a selection of data items by a user, associating selected data items with an increased relevance to the search query, and presenting a second search result wherein the ranking of the data items included in the search result is based on the association from a previous search.

BRIEF DESCRIPTION OF THE DRAWINGS

FIGS. 7A-7B are an exemplary screen image of another embodiment of the user interface shown in FIG. 4 used to drill down into documents that are the results of a search.

DETAILED DESCRIPTION

The disclosure describes a document repository for document collection and a note panel for copying and pasting texts and images from returned documents from a query. Users' document collecting action and note-taking action is used as the base of relevance feedback. The relevance feedback is collected unobtrusively but effectively, and greatly improves the search relevancy. This unobtrusive interactive relevance feedback method overcomes the drawbacks of traditional interactive relevance feedback method—the extra time needed and interruption of tasks. It provides a novel, efficient and precise way of collecting interactive relevance feedback. Different with prior relevance feedback methods for search engine, no extra time is required to fill a feedback form. More useful feedback information is collected from search users without users' notice. Search results are improved. This disclosure describes novel unobtrusive methods and systems to collect search result relevance feedback from a user. Such feedback is then used in relevance feedback algorithms during subsequent search queries to improve the search efficiency and accuracy.

The methods and systems include a search document collection panel for the user to collect user interested documents and a note panel for the user to take notes. The user can drag and drop documents from the document collection panel for further reference. The user can also open a document and copy and paste text, audio, video, and images from the document to be saved in the notes.

A document repository is designed for user to drag and drop documents determined to be useful after the search results returned from a query. When the user drags and drops a document, a positive assessment is marked for the document for the query. A note panel is designed for the user to copy and paste text and other objects such as video, audio, and image clips determined to be useful When the user copies and pastes from a document to the note panel, a positive assessment is marked for the document for the search. A document and a query will be highly correlated if the document receives some positive assessment from the user for the query. And this information will be used to return the same document and rank the document higher when the user performs subsequent searches.

The methods and systems describe a method of receiving relevance feedback from the user without interrupting the user's search activities. The user feedbacks facilitate improving the search performance for a search engine in many different ways, such as improving search relevancy in future searches and building a user profile such that the search results are more customized for the user.

Figure 1:
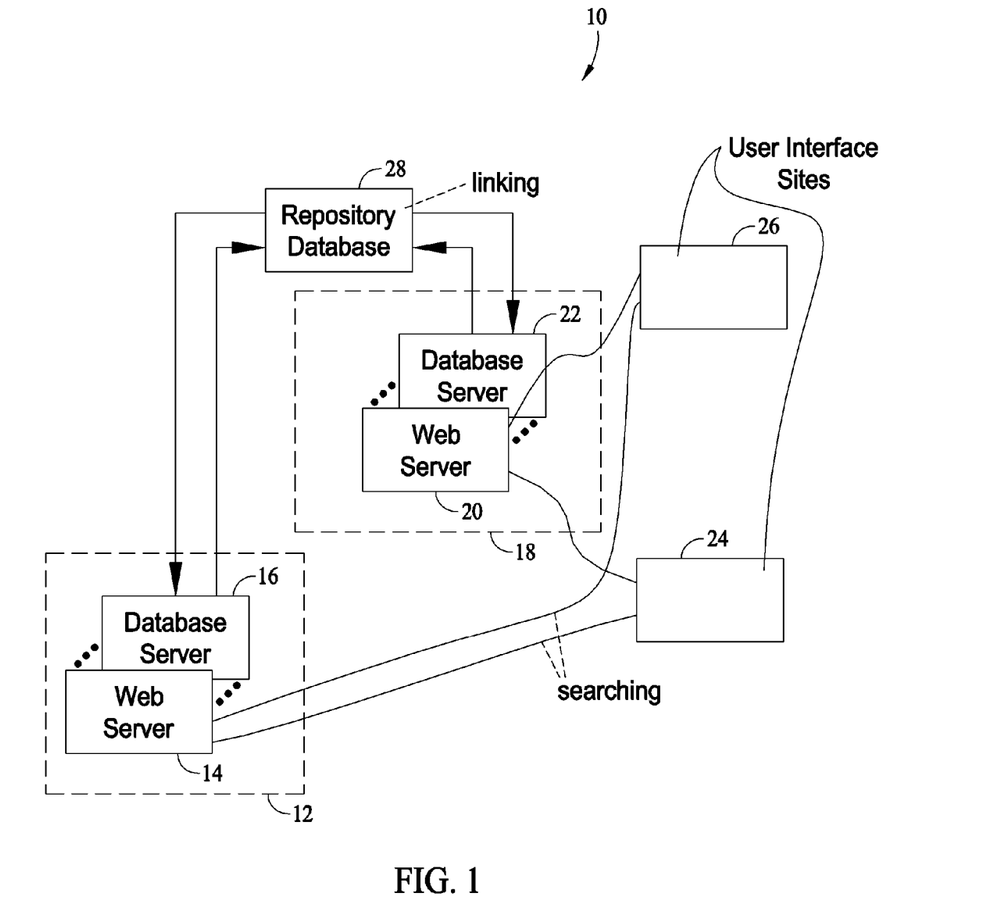
FIG. 1 is a block diagram of an embodiment of a system for task-based searching of information sources in accordance with an embodiment of the present disclosure.

FIG. 1 is a block diagram of an embodiment of a system 10 for task-based searching of information sources in accordance with an embodiment of the present disclosure. System 10 includes a server site 12 that includes a web server 14 and a database server 16. System 10 further includes a server site 18 that includes a web server 20 and a database server 22. System 10 also includes user interface sites 24 and 26. System 10 further includes a repository database 28. User interfaces sites 24 and 26 include computers, including, for example and without limitation, personal computers (PCs) capable of accessing a network such as the web. User interface sites 24 and 26 are connected to any of server sites 12 and 18, potentially through the network. Server sites 12 and 18 are capable of reading data from and writing data to data repository database 28.

Repository database 28 includes product data such as, without limitation, design drawings, maintenance records, technical manuals, and regulatory directives for systems, components, and parts of for example, an aircraft. Repository database 28 further includes project data such as a project name, an origination date of the project, a status of the project, a model number to a product that the project pertains, an Air Transport Association (ATA) System Identification chapter number, and a customer identification number for the project. Repository database 28 may also include models such as CAD models, layouts, engineering drawings, and product structure data. Repository database 28 includes commercial information such as supplier and consumer information for various parts and products. Repository database 28 includes images, multi-media and product commissioning and in-service test results.

Figure 2:
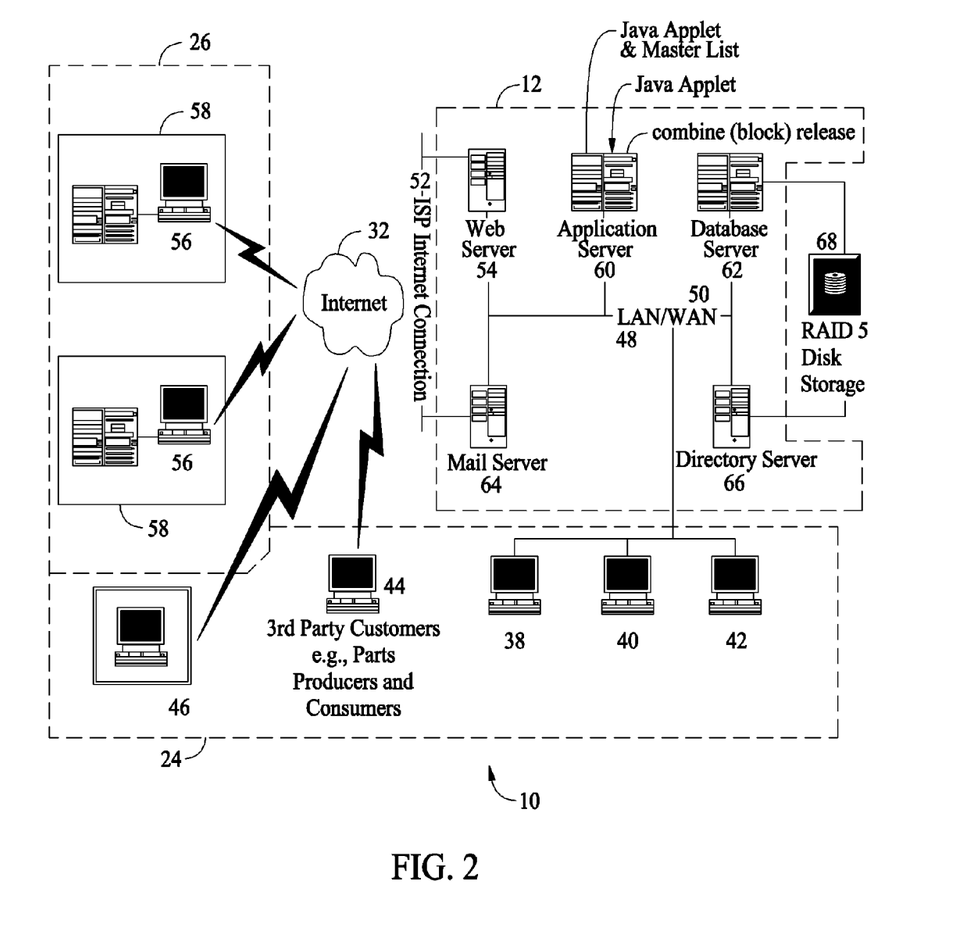
FIG. 2 is a detailed block diagram of an embodiment of a system for task-based searching of information sources in accordance with an embodiment of the present disclosure.

FIG. 2 shows a detailed block diagram of an embodiment of a system 10 for task-based searching of information sources. System 10 includes user interface sites 24 and 26, and server site 12. Internet web 32 may be used to interconnect any of a plurality of user interface sites 24 and 26 to a plurality of server sites, for example, server site 12. Computers 38, 40, 42, 44, and 46 of user interface site 24 are connected to server site 12 via web 32, or potentially via more direct LAN/WAN connections, as exemplified by a LAN connection 48 and a WAN connection 50. If connected via web 32, internet service provider (ISP) connections 52 provide access from computers 38, 40, 42, 44, and 46 of user interface site 24 to web servers, such as for example, web server 54, of server site 12. Computers 56 of user interface site 26 are connected to server site 12 in a similar manner as computers 38, 40, 42, 44, and 46 of user interface site 24 are connected to server site 12.

Computers 56 are a part of a Technical Data Search Engine system (TDSE), such as each of TDSE systems 58. As an example, computers 56 of user interface site 26 are located within an Operations Center or Service Engineering Group. In the example, computers 38, 40, 42, 44, and 46 of user interface site 24 are located within the engineering divisions and used by engineers with permissions for access to system 10. Server site 12 includes an application server 60, a database server 62, a mail server 64, and a directory server 66. Any of servers 54, 60, 64, and 66 are connected to a data repository 68 via database server 62. The repository data stored within data repository 68 is the same as the repository data stored within repository database 28.

Any of servers 54, 60, 62, 64, and 66 execute the methods for a collaborative task-based search model. The methods for the task-based search model include performing document management functions, which include searching for and selecting the repository data from data repository 68, creating the repository data for optional storage into data repository 68, editing the repository data, and retrieving the repository data from data repository 68. Moreover, the document management functions include linking the repository data within data repository 68, and organizing the data in accordance with naming conventions received from users searching for information relating to one or more customer service requests.

The project management functions also include, but are not limited to, receiving service requests directly from customers or from the customer through input by a user, receiving search criteria from the user to initiate a search of data sources selected by the user, generating a project folder to store search results that are determined to be relevant to the service request by the user. Additionally, the user may select portions of documents to insert into a note area of the database and associated with the project folder to further specify the relevance of certain search results. The project folder is accessible to other users who may receive similar service requests in the future so that previous searching may be reused to facilitate responding to the subsequent service request in a shorter amount of time than the first service request.

Figure 3:
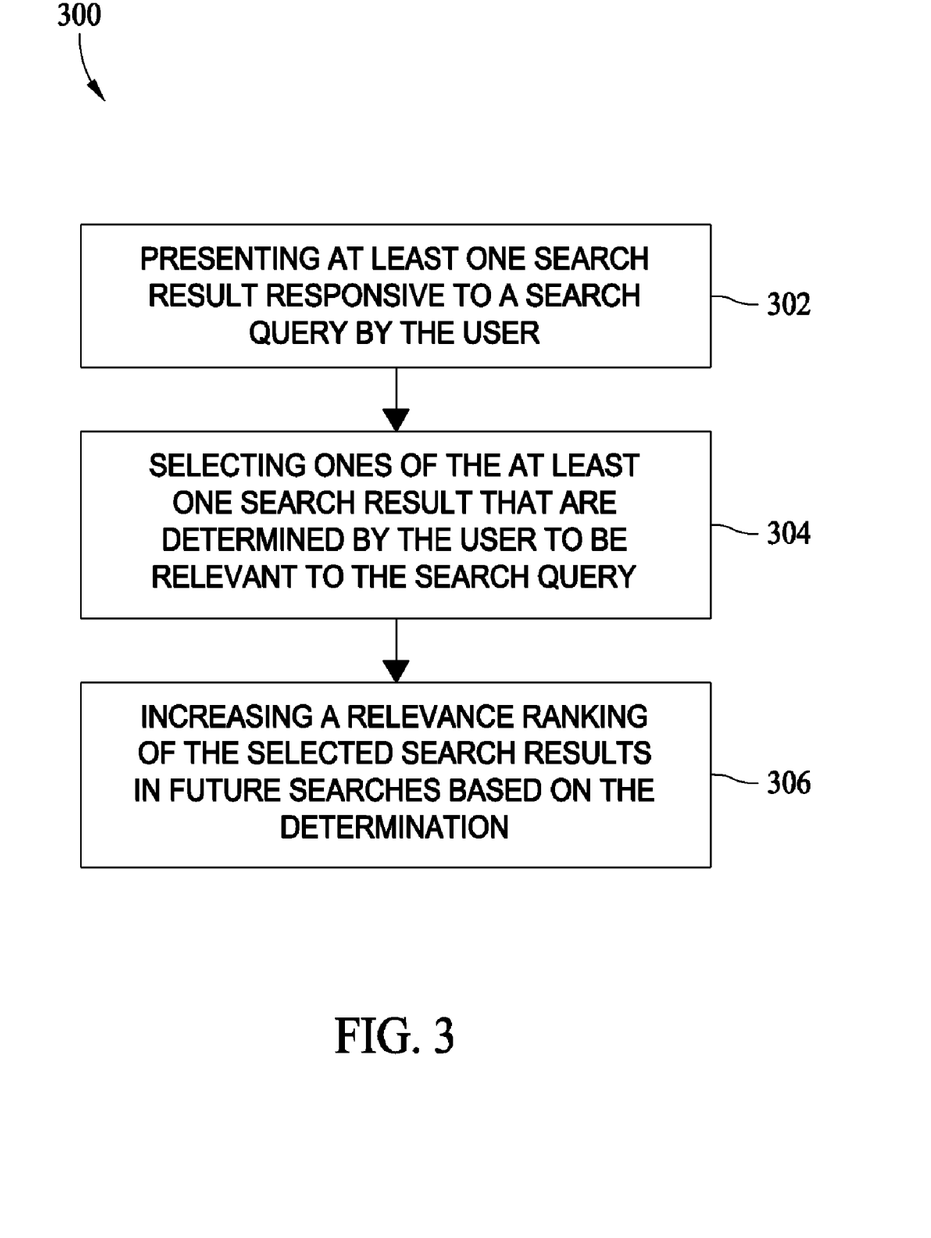
FIG. 3 is a flow diagram of an exemplary method of receiving feedback from a user regarding the relevance of search results to a search query.

FIG. 3 is a flow diagram of an exemplary method 300 method of receiving feedback from a user regarding the relevance of search results to a search query. Method 300 includes presenting 302 at least one search result responsive to a search query by the user, selecting 304 ones of the at least one search result that are determined by the user to be relevant to the search query, and increasing 306 a relevance ranking of the selected search results in future searches based on the determination. In the exemplary embodiment, the search result is presented in a search result panel or area of a user interface. The search result includes one or more file identifiers of electronic files that may be relevant to the search based on the keywords. The user may select each file identifier and open the file to inspect its contents. If the document contained in the file is determined to be relevant, the user may drag and drop the file identifier into a document repository area of the user interface. This action is interpreted as an indication that the user has determined the file to be relevant to the search and a positive relevance assessment is marked for the document for the query. Similarly cutting and pasting a generated note from a notes panel to the document repository also marks a positive assessment for the document for the query. The positive assessment is used by the search algorithm to increase the ranking of the search results presented to the user on subsequent searches.

Figure 4:
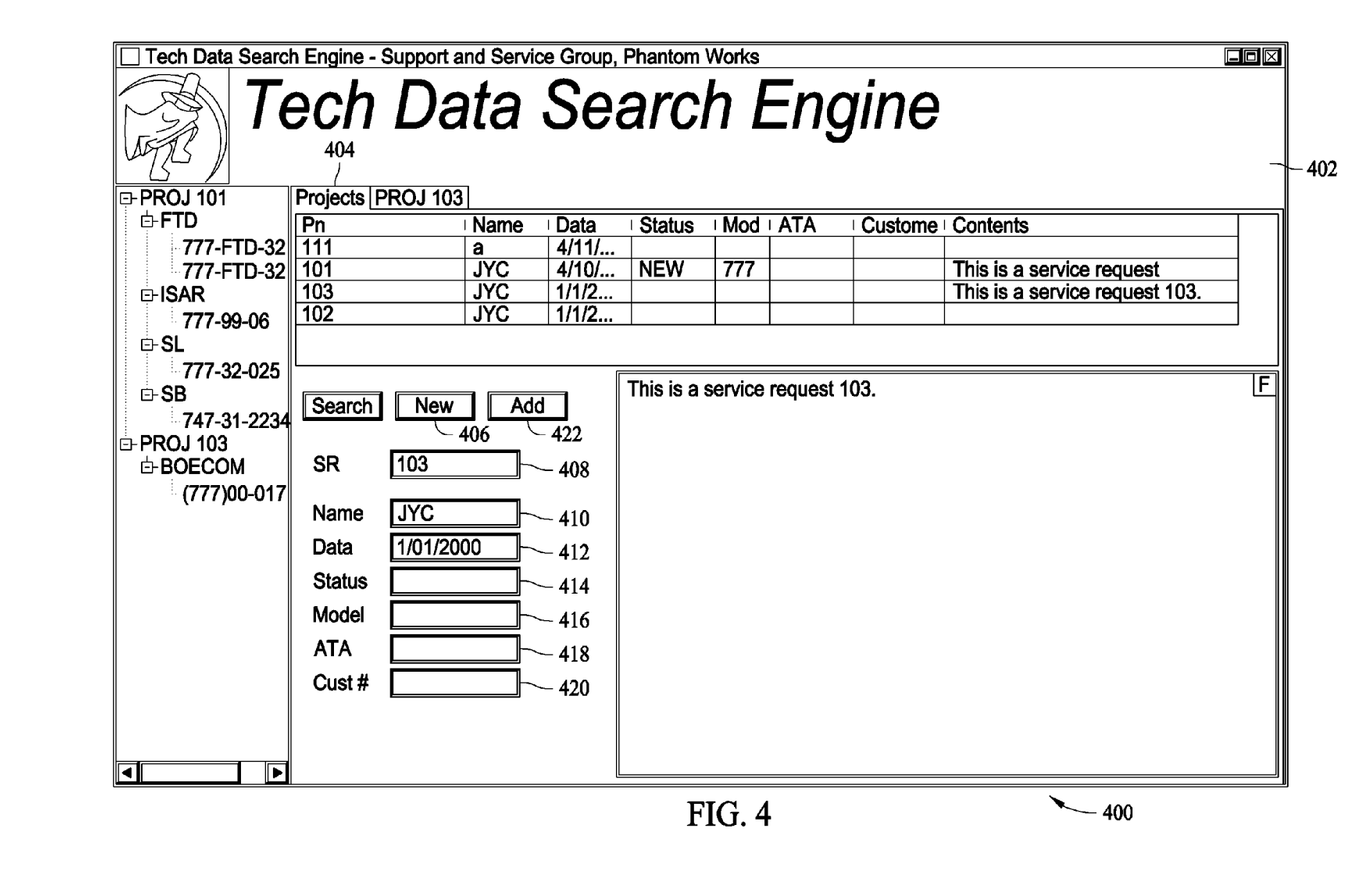
FIG. 4 is an exemplary screen image of a user interface that may be used with the system shown in FIG. 1.

FIG. 4 is an exemplary screen image 400 of a user interface 402 that may be used with system 10 (shown in FIG. 1). When the TDSE application begins execution, a user is prompted to sign on, for example, using a network single sign-on. If successful, the user interacts with the application through a Projects Screen and a Search Screen. The Projects Screen permits the user to generate, search, and review prior projects. The Search Screen permits the user to search and work on a specific project. A Data Sources Dialog Window within the Search Screen allows the user to direct the scope of a search by specifying the data sources for the search.

The TDSE application is organized around the concept of a project. The user creates a project in response to a particular search interest for example, a service request for a customer. A user can also initiate searches or generate notes. From the search results, a user can associate reference materials with a project. Queries and Notes are referred to as project actions. Such Queries and Notes are saved and can be recalled for later review at any time.

The TDSE application is used to look up information from a variety of data sources so that a user can simultaneously and selectively access relevant documents. Based on a single user input, multiple searches are initiated. Results from diverse data sources are then aggregated, sorted, ranked, and presented consistently and coherently to the user.

A project may be added automatically by an incoming service request such as via an email from the customer. TDSE automatically receives and parses the data in the email that is entered by the customer. A project may also be generated manually by the user in response to a service request from the customer via for example, a telephone call. To add a project, the user selects a "Projects" tab 404 and selects a "New" button 406. The user then fills in data input fields presented on user interface 402. Specifically, the user enters a unique project name in an "SR" field 408 comprising alphanumeric characters. Optional fields may also be filled in with data that may be available at the time the project is originated or may be filled in at a later time when details of the service request are made clear. To fill in any optional fields, the user enters information in a "Name" field 410, a "Date" field 412, a "Status" field 414, a "Model" field 416, an Air Transport Association (ATA) System Identification chapter number in an "ATA" field 418, and a customer identification number for the request in a "Customer #" field 420. To initiate the addition process, the user selects an "Add" button 422.

Figure 5A:
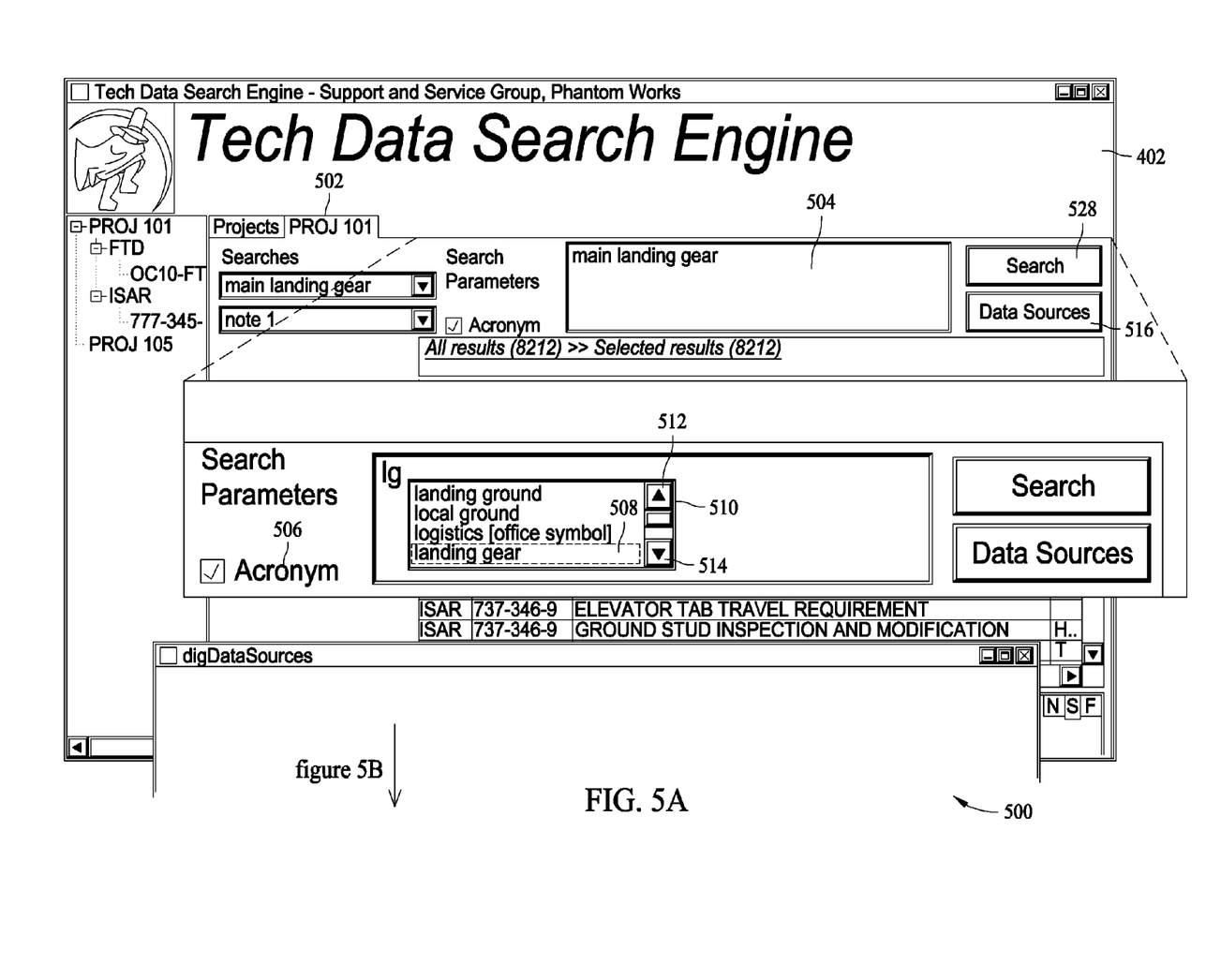
FIGS. 5A-5B are an exemplary screen image of another embodiment of the user interface shown in FIG. 4 used to initiate a document search.
Figure 5B:
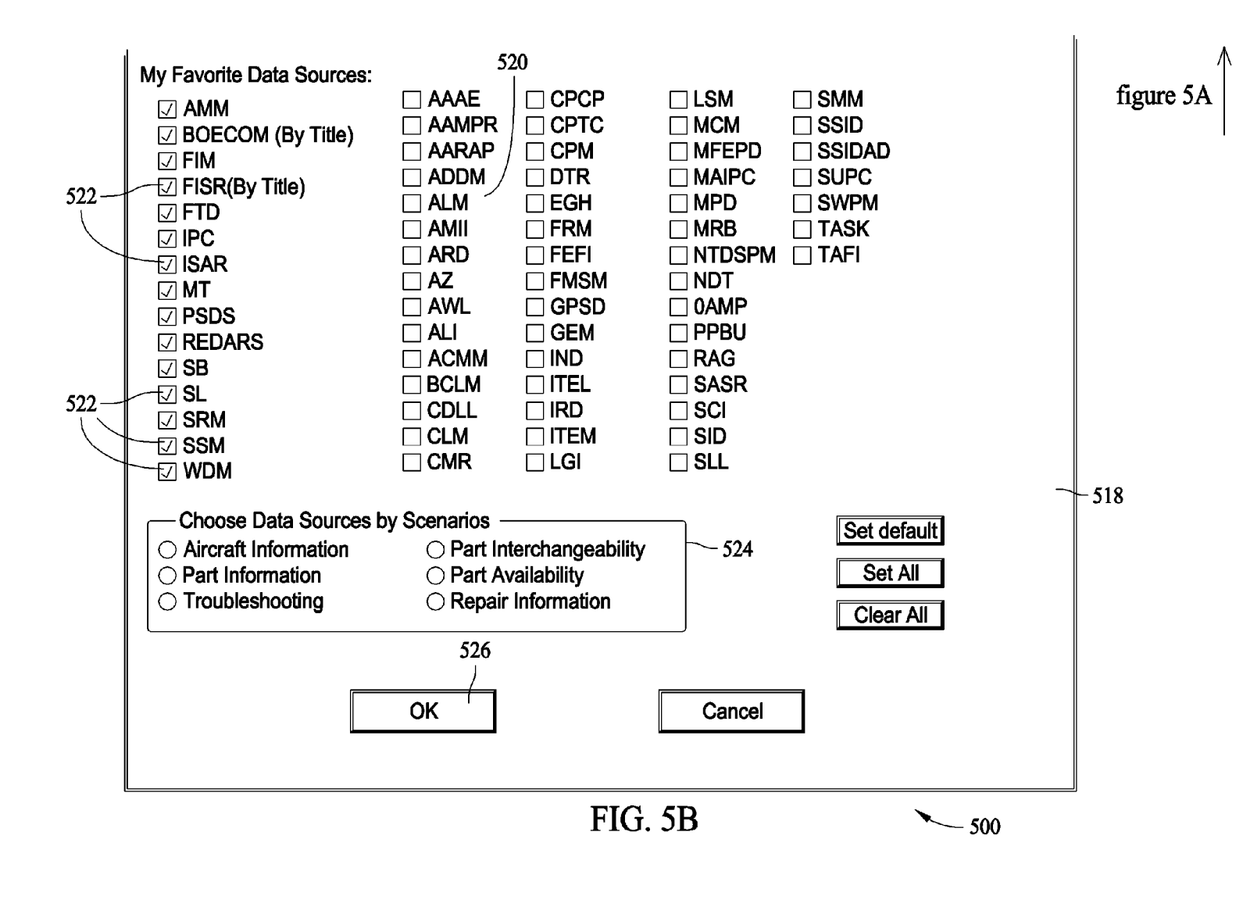

FIGS. 5A-5B are an exemplary screen image 500 of another embodiment of user interface 402 (shown in FIG. 4) used to initiate a document search. To initiate the search, the user selects a "PROJ xxx" tab 502 where xxx represents the project name. The user then fills in search keywords the user has determined will facilitate locating the documents containing the proper information relating to a service request receives from a customer in a "Search Parameters" area 504. To enable acronym support, the user selects an acronym check box 506. The user selects acronym check box 506 to leave the box unchecked to disable acronym support. When enabled, an acronym expansion list 508 is displayed in a drop down box 510 when a series of letters that represents an acronym is entered into "Search Parameters" area 504. The user selects an up arrow 512 or down arrow 514 to select the proper expansion. The user then presses the "enter" key to exit drop down box 510 with the selection or presses a "cancel" key to exit without a selection.

To select or unselect data sources to be searched, the user selects a "Data Sources" button 516 and a data sources selection window 518 is displayed. The user determines which data sources 520 are used for the search by selecting a check box 522 associated with the determined data sources. The user selects a checked box to deselect the associated data source 520 to exclude data source 520 from the search. The user may also select a check box 524 corresponding to a desired scenario to select a group of data sources by scenario. Such scenarios include but are not limited to aircraft information, part information, troubleshooting, part interchangeability, part availability, and part information. The user then selects an "OK" button to exit data sources selection window 518. To initiate the search the user selects a "Search" button 528. The label on "Search" button 528 changes to "Stop Search" while the search is executing. When all the selected searches are completed, the label of "Search" button 528 changes back to "Search."

Figure 6:
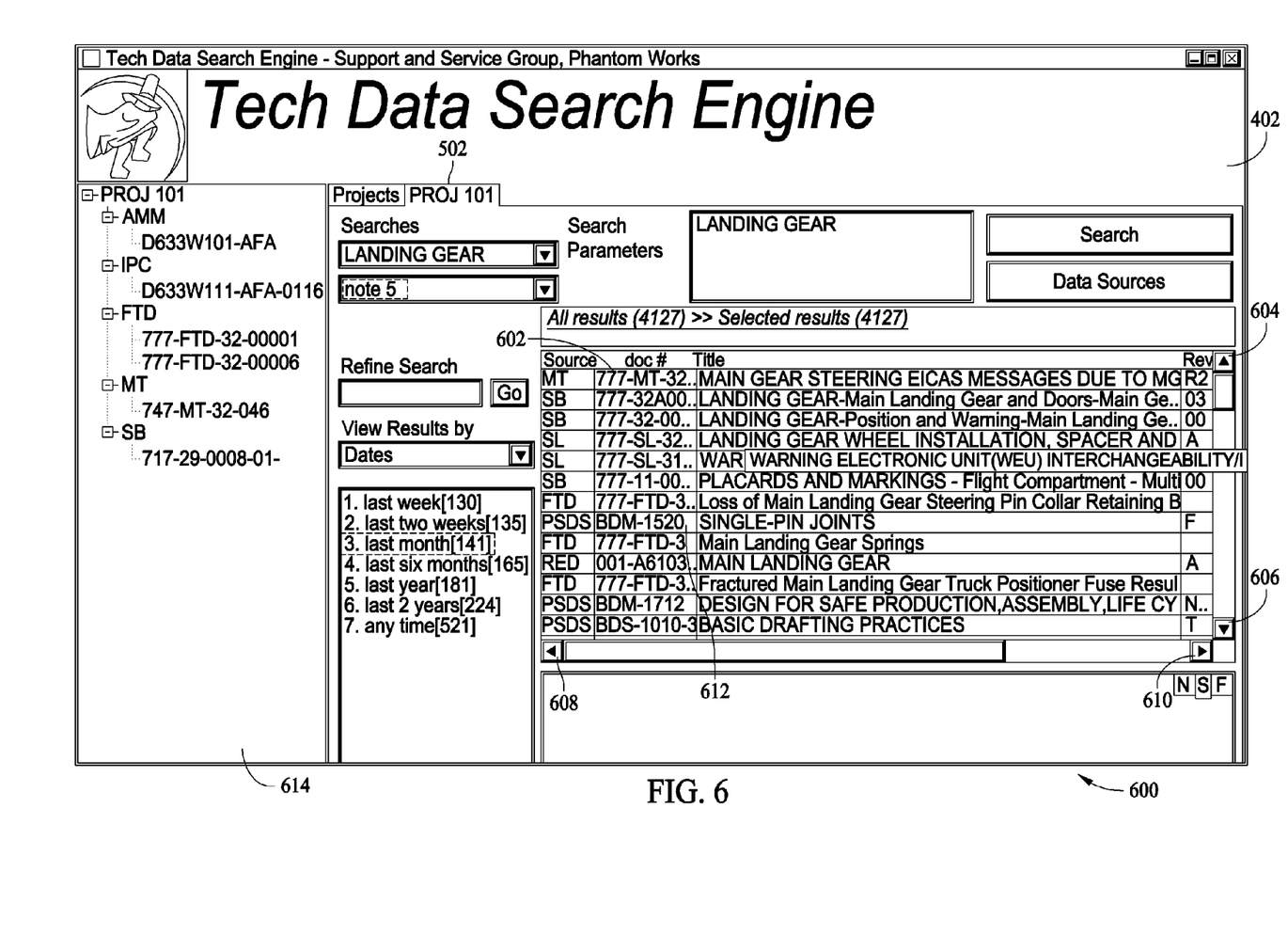
FIG. 6 is an exemplary screen image of another embodiment of the user interface shown in FIG. 4 used to view search result documents that are responsive to a search.

FIG. 6 is an exemplary screen image 600 of another embodiment of user interface 402 (shown in FIG. 4) used to view search result documents that are responsive to a search. To view search result documents, the user selects "PROJ xxx" tab 502 where xxx represents the project name. To view a document, the user selects a row 602 containing the desired project name by for example, double clicking on the left mouse button with the cursor over row 602. To view more documents, the user selects an "Up" arrow 604 to scroll up or a "Down" arrow 606 to scroll down. To view still more information, the user selects a "Left" arrow 608 to scroll left or a "Right" arrow 610 to scroll right. To associate a document to a project, the user selects the document to highlight a row 612, drags the document icon to the desired project on project pane 614, and releases the mouse button when the cursor arrow is over the desired project. System 10 monitors the activity of the user with respect to documents selected and associated with a project by, for example, marking a positive assessment of a document that is dragged and dropped into a project. Such activity is interpreted as an indication that the user has assessed the document and determined the document to be relevant to the search query.

Figure 7B:
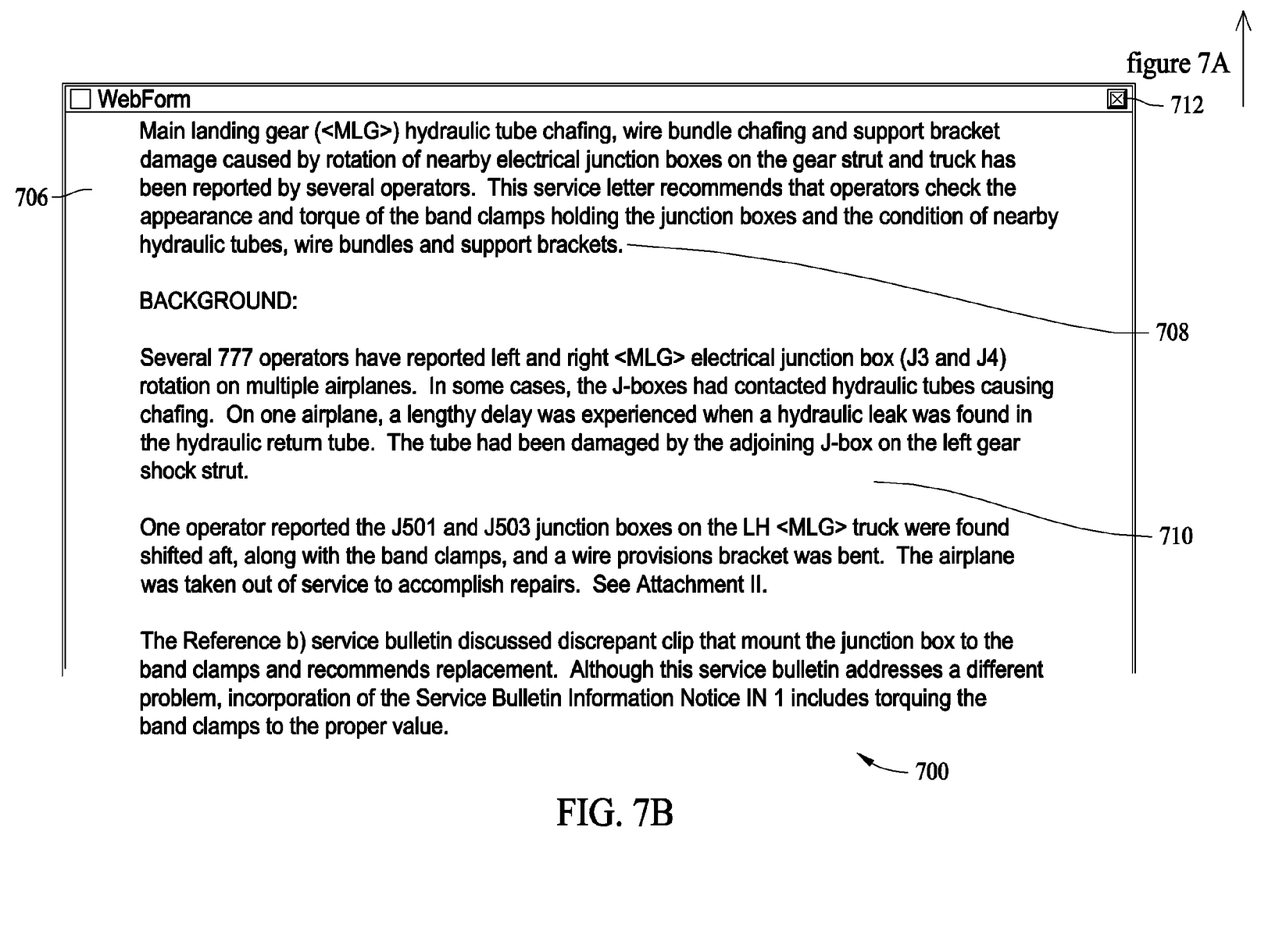

FIGS. 7A-7B are an exemplary screen image 700 of another embodiment of user interface 402 (shown in FIG. 4) used to drill down into documents that are the results of a search. As used herein, "snippets" are small segments of the document containing the search text. To view snippets in a document, the user click on the right mouse button over the desired document 702. A pop up window 704 opens with the snippets from the chosen document. A left click on any snippet will open the HTML version of the document in a separate window 706. To navigate within a document, the user selects a "≦" character to go to a previous occurrence 708 of a search word within the document or selects a "≧" character to go to the next occurrence 710 of a search word within the document. To close the document, the user selects an "X" button 712.

Figure 8:
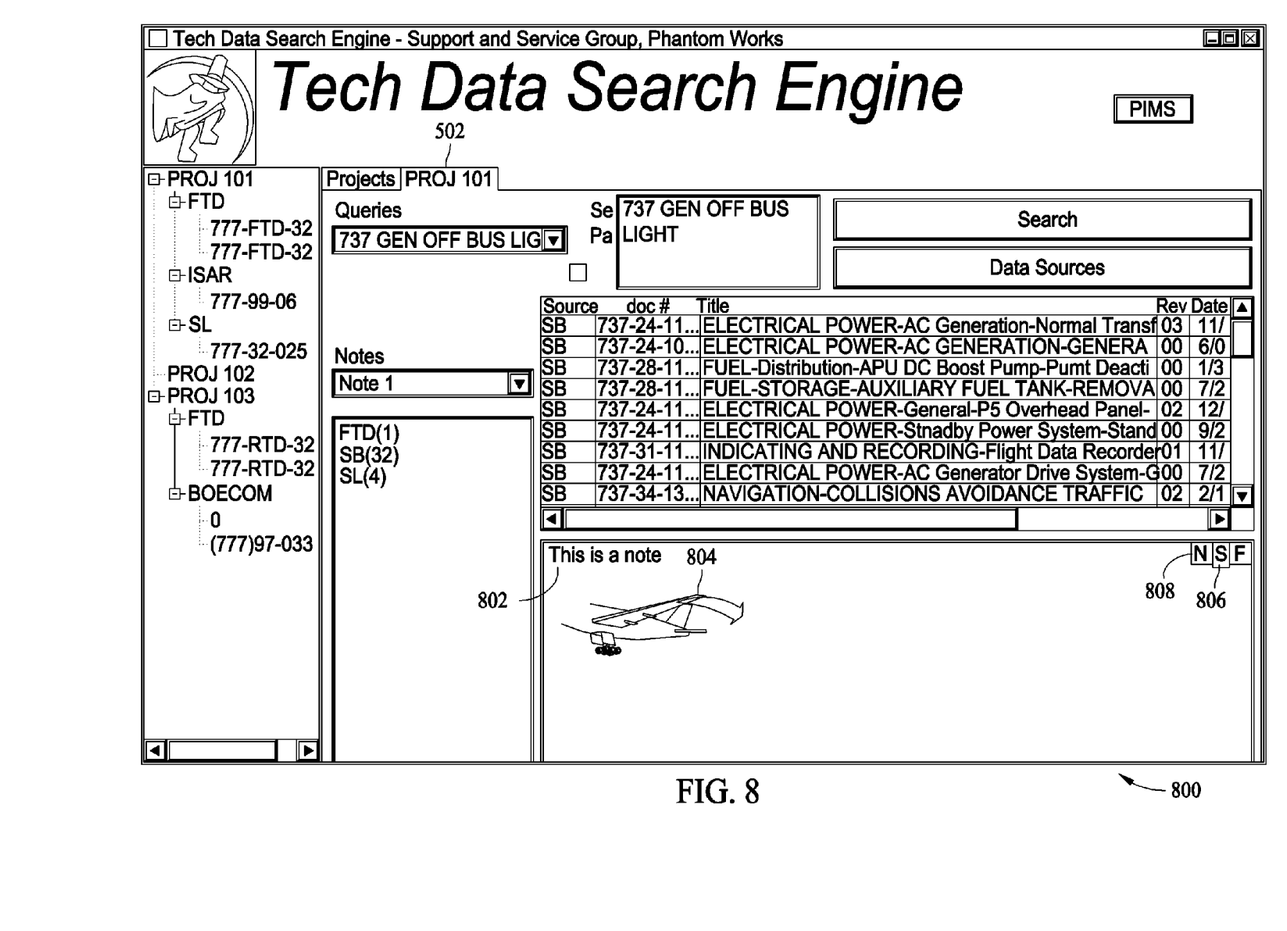
FIG. 8 is an exemplary screen image of another embodiment of the user interface shown in FIG. 4 used to add notes to a project.

FIG. 8 is an exemplary screen image 800 of another embodiment of user interface 402 (shown in FIG. 4) used to add notes to a project. To add a note, the user selects "PROJ xxx" tab where xxx represents the project name. Notes may be entered directly to a notes area 802 by typing the desired text in notes area 802, may be cut from a source document and pasted into notes area 802 by highlighting the area to copy, pressing "ctrl-c" or right clicks the mouse button and selects the "Copy" option or the equivalent. The user then returns to the TDSE Project Screen, places the cursor at the insertion point 804, and presses "ctrl-v" or right clicks the mouse button and selects the "Paste" option or the equivalent. To save the new information, the user selects an "S" button 806. To add a new note, the user selects an "N" button 808. To view the note in separate window, the user selects "F" button 616. System 10 monitors the activity of the user with respect to notes added to notes area 802, or notes selected and associated with a project by, for example, marking a positive assessment of the note that is generated or that is dragged and dropped into a project. Such activity is interpreted as an indication that the user has assessed the document and determined the document to be relevant to the search query.

The above-described methods and systems for unobtrusive relevance feedback collection from a user are cost-effective and highly reliable. The methods and systems include monitoring the selection of particular search results that are determined by the user to be relevant to the search being conducted and increasing the results rank in subsequent searches. Accordingly, the methods and systems facilitate producing relevance feedback for document searches in a cost-effective and reliable manner.

While embodiments of the disclosure have been described in terms of various specific embodiments, those skilled in the art will recognize that the embodiments of the disclosure can be practiced with modification within the spirit and scope of the claims.

What is claimed is:

1. A method of receiving feedback from a user regarding the relevance of search results to a search query, said method comprising:
    using an adaptive search engine to present at least one search result responsive to a first search query by the user, the at least one search result comprising one or more file identifiers, each of the one or more file identifiers corresponds to an electronic file;
    receiving, via a user interface, a user selection of one of the one or more file identifiers, wherein the electronic file corresponding to the selected file identifier is presented with a first ranking in the search results;
    opening the electronic file corresponding to the selected file identifier;
    monitoring a note panel associated with the first search query for an addition of a note by a user, the addition of the note comprising copying and pasting at least a portion of the opened electronic file or dragging and dropping at least a portion of the electronic file into the note panel, wherein the portion of the opened electronic file is determined by the user to be relevant to the first search query;
    increasing a relevance ranking, with respect to the first search query, of the electronic file as the note is added to the note panel by the user, wherein the increased relevance ranking causes the electronic file to be presented with a second ranking higher than the first ranking when a future search is performed using the same first search query;
    storing the portion of the electronic file in the note panel associated with the first search query such that the note panel is accessible at a future time by at least one of the user and a second user; and
    providing the at least one of the user and the second user with the portion of the electronic file when responding to a second search query similar to the first search query by locating and accessing the note panel associated with the first search query.

2. A method in accordance with claim 1 further comprising selecting one or more data sources to be searched from a plurality of data sources.

3. A method in accordance with claim 2 further comprising entering one or more keywords on which to search the selected data sources for search results relevant to the one or more keywords.

4. A method in accordance with claim 1 further comprising displaying a search document collection panel that includes a document repository and the notes panel.

5. A method in accordance with claim 4 wherein presenting at least one search result comprises presenting the one or more file identifiers to the user in the search document collection panel.

6. A method in accordance with claim 4 wherein monitoring the user pasting the portion to the notes panel further comprises monitoring the user dragging and dropping a note from the notes panel to the document repository.

7. A method in accordance with claim 4 wherein increasing a relevance ranking of the selected electronic file comprises increasing a relevance ranking responsive to notes added to the document repository.

8. A method in accordance with claim 1 wherein presenting at least one search result comprises presenting a ranked search result listing of the one or more file identifiers, wherein the ranking is based on a determination of the relevance of the search result to the first search query.

9. A method in accordance with claim 1 further comprising increasing the relevance ranking of the selected electronic file responsive to entering a text based note into the notes panel.

10. A method in accordance with claim 1 further comprising displaying, via the user interface, one or more segments of the electronic file corresponding to the selected file identifier.

11. A system for improving the relevancy of electronic search results over a plurality of searches comprising:
    an adaptive search engine communicatively coupled to a plurality of data items from one or more data sources stored in at least one database, said data sources searchable using a first search query entered by a user wherein said first search query comprises at least one keyword, said adaptive search engine configured to generate a ranked search result listing, the ranked search result listing comprising one or more file identifiers, wherein each of the one or more file identifiers corresponds to one of the plurality of data items;
    a processor; and
    a user interface configured to:
        display to the user the ranked search result listing of file identifiers in a first display area,
        receive, from the user, a selection of one of the file identifiers, wherein the data item corresponding to the selected file identifier is ranked with a first ranking in the search result listing,
        facilitate opening the data item that corresponds to the selected file identifier,
        display a content of the data item to the user,
        receive, from the user, a selection of at least a portion of the content of the data item for adding to a note panel associated with said first search query as a note, wherein the selection is received via copying and pasting or dragging and dropping the portion of the content into the note panel by the user, wherein the portion of the content is determined by the user to be relevant to said first search query;
        increase, via the processor, a relevancy ranking of the data item with respect to the at least one keyword as the note is added to the note panel, and wherein the increased relevancy ranking causes the data item to be ranked with a second ranking higher than the first ranking in a future search result listing generated using the same at least one keyword;

store the portion of the content in the note panel associated with said first search query such that the note panel is accessible at a future time by at least one of the user and a second user; and provide the at least one of the user and the second user with the portion of the content when responding to a second search query similar to said first search query by locating and accessing the note panel associated with said first search query.

12. A system in accordance with claim 11 wherein when a note generated in said note panel is selected and copied to a data repository a relevance of the note with respect to the at least one keyword is increased.

13. A system in accordance with claim 11 further comprising a data source selector configured to permit the user to select one or more data sources to be searched from a plurality of data sources.

14. A system in accordance with claim 13 configured to receive one or more keywords entered by the user on which to search the selected data sources for search results relevant to the one or more keywords.

15. A system in accordance with claim 11 configured to present a ranked search result listing wherein the ranking is based on a determination of the relevance of the search result to said first search query.

16. A method of performing searches of a plurality of data sources that each includes at least one data item, the searches performed using relevance feedback from previous searches, said method comprising:

presenting a first search result of the data sources to a user, the first search result obtained using an adaptive search engine, based on a first search query, wherein the search result includes at least one file identifier that corresponds to at least one data item in ranked order based on a relevancy ranking of the data item with respect to the first search query;

receiving, from the user, a selection of one of the at least one file identifiers;

presenting the data item corresponding to the selected file identifier for viewing by the user;

unobtrusively monitoring an addition of a note to a note panel associated with the first search query by the user, the note including at least a portion of the selected data item, the at least a portion of the selected data item selected via copying and pasting or dragging and dropping of the note into the note panel, wherein the at least a portion of the selected data item is determined by the user to be relevant to the first search query;

associating the addition of the note with an increased relevancy ranking with respect to the first search query as the note is added to the note panel;

storing the at least a portion of the selected data item in the note panel associated with the first search query such that the note panel is accessible at a future time by at least one of the user and a second user;

providing the at least one of the user and the second user with the at least a portion of the selected data item when responding to a second search query similar to the first search query by locating and accessing the note panel associated with the first search query.

17. A method in accordance with claim 16 wherein the first search query comprises at least one keyword.

18. A method in accordance with claim 17, wherein presenting the data item corresponding to the selected file identifier comprises:

locating at least one segment of the data item that includes the at least one keyword of the first search query; and displaying the at least one segment of the data item for viewing by the user.

19. A method in accordance with claim 16 further comprising associating the user selection of at least a portion of the selected data item with an increased relevancy ranking with respect to the first search query as the data item is dragged and dropped from the search result to a document repository.

20. A method in accordance with claim 16 further comprising associating the user selection of at least a portion of the selected data item with an increased relevancy ranking with respect to the first search query as a note generated at the notes panel is dragged and dropped to a document repository, wherein the generated note includes at least one of a portion of a data item, an annotation entered by the user wherein the annotation includes a text entry, an audio entry, a video entry, and an image entry.

* * * * *